US012569924B2

(12) United States Patent (10) Patent No.: US 12,569,924 B2
Ojanen (45) Date of Patent: Mar. 10, 2026

(54) METHODS FOR FORMING A ROTATABLE CUTTING BIT WITH KEYED ALIGNMENT

(71) Applicant: Randall W. Ojanen, Bristol, TN (US)

(72) Inventor: Randall W. Ojanen, Bristol, TN (US)

( * ) Notice: Subject to any disclaimer, the term of this patent is extended or adjusted under 35 U.S.C. 154(b) by 0 days.

(21) Appl. No.: 19/079,813

(22) Filed: Mar. 14, 2025

(65) Prior Publication Data

US 2025/0375826 A1     Dec. 11, 2025

Related U.S. Application Data

(63) Continuation of application No. PCT/US2024/033269, filed on Jun. 10, 2024.

(51) Int. Cl.
B23K 1/00 (2006.01)
B23K 101/00 (2006.01)

(52) U.S. Cl.
CPC ...... B23K 1/0008 (2013.01); B23K 2101/002 (2018.08)

(58) Field of Classification Search
CPC ........... B23K 1/0008; B23K 1/19; B23K 1/20
See application file for complete search history.

(56) References Cited

U.S. PATENT DOCUMENTS

| | | |
|---|---|---|
| 4,492,278 A | 1/1985 | Leighton |
| 4,497,520 A | 2/1985 | Ojanen |
| 4,529,048 A | 7/1985 | Hall |
| 4,547,020 A | 10/1985 | Ojanen |

| | | | | |
|---|---|---|---|---|
| 4,627,665 A | * | 12/1986 | Ewing | B21K 5/02 228/124.1 |
| 4,743,069 A | | 5/1988 | Ojanen | |
| 5,112,165 A | * | 5/1992 | Hedlund | B28D 1/188 407/66 |
| 5,823,632 A | * | 10/1998 | Burkett | E21C 35/183 299/111 |
| 6,196,636 B1 | * | 3/2001 | Mills | E21C 35/183 299/113 |
| 6,375,272 B1 | | 4/2002 | Ojanen | |
| 6,758,530 B2 | * | 7/2004 | Sollami | B28D 1/188 299/113 |
| 7,338,135 B1 | * | 3/2008 | Hall | E21C 35/197 299/107 |

(Continued)

OTHER PUBLICATIONS

Kari Rodriquez, Notification of Transmittal, International Search Report and the Written Opinion, Nov. 26, 2024, 19 pages, International Searching Authority/United States, Alexandria, Virginia, United States of America.

*Primary Examiner* — Erin B Saad
(74) *Attorney, Agent, or Firm* — Coughlin Law Office LLC; Stuart M. Aller; Daniel J. Coughlin

(57) ABSTRACT

A method for forming a rotatable cutting bit involves inserting a mass of brazing alloy into a first cavity in a tool body, with a portion of the alloy protruding. A cutting tip is mounted onto the tool body by aligning a second cavity of the cutting tip with the protruding portion of the alloy. The first cavity and the second cavity are keyed into coaxial alignment with the bit's central longitudinal axis by the mass of brazing alloy. The cutting tip is then brazed to the tool body with the mass of brazing alloy. During brazing, the alloy extends into a gap defined between the tool body and the cutting tip. The assembly may be heated in a furnace to melt the alloy into the gap to ensure a secure bond.

20 Claims, 2 Drawing Sheets

(56) References Cited

U.S. PATENT DOCUMENTS

| | | | | |
|---|---|---|---|---|
| 7,360,845 | B2 | 4/2008 | Ojanen | |
| 7,380,888 | B2 | 6/2008 | Ojanen | |
| 7,413,257 | B2 | 8/2008 | Ojanen | |
| 7,458,646 | B2 | 12/2008 | Marathe et al. | |
| 7,661,765 | B2 * | 2/2010 | Hall | E21C 35/197 |
| | | | | 299/113 |
| 7,959,234 | B2 | 6/2011 | Cameron et al. | |
| 8,033,616 | B2 | 10/2011 | Hall et al. | |
| 8,454,096 | B2 * | 6/2013 | Hall | E21B 10/16 |
| | | | | 299/113 |
| 8,500,209 | B2 * | 8/2013 | Hall | E21C 35/183 |
| | | | | 299/106 |
| 8,678,517 | B2 * | 3/2014 | Monyak | E21C 35/183 |
| | | | | 299/113 |
| 9,074,471 | B2 | 7/2015 | Ojanen | |
| 9,605,538 | B2 | 3/2017 | Voitic et al. | |
| 9,702,251 | B2 | 7/2017 | Ojanen | |
| D844,684 | S | 4/2019 | Ojanen | |
| 11,339,654 | B2 * | 5/2022 | Sollami | E21C 35/1837 |
| 2003/0052530 | A1 * | 3/2003 | Sollami | B28D 1/188 |
| | | | | 299/113 |
| 2003/0122414 | A1 * | 7/2003 | Sollami | B28D 1/188 |
| | | | | 299/113 |
| 2003/0209366 | A1 * | 11/2003 | McAlvain | E21C 35/183 |
| | | | | 299/113 |
| 2007/0090679 | A1 | 4/2007 | Ojanen | |
| 2007/0090680 | A1 | 4/2007 | Ojanen | |
| 2008/0258536 | A1 * | 10/2008 | Hall | E21B 10/36 |
| | | | | 299/113 |
| 2008/0309149 | A1 | 12/2008 | Hall et al. | |
| 2015/0035343 | A1 | 2/2015 | Ojanen | |
| 2016/0273356 | A1 | 9/2016 | Ojanen | |
| 2017/0342831 | A1 | 11/2017 | Weber et al. | |
| 2019/0292858 | A1 | 9/2019 | Rostvall | |
| 2020/0149397 | A1 | 5/2020 | Ojanen | |
| 2022/0042414 | A1 | 2/2022 | Weinbach et al. | |

* cited by examiner

METHODS FOR FORMING A ROTATABLE CUTTING BIT WITH KEYED ALIGNMENT

CROSS REFERENCES

This application is a continuation of International Application No. PCT/US2024/033269, entitled "Rotatable Cutting Bit with Keyed Alignment", filed on 10 Jun. 2024, which is incorporated herein by reference in its entirety.

REFERENCE TO RESEARCH

Not Applicable.

REFERENCE TO CDS

Not Applicable.

TECHNICAL FIELD

The present disclosure relates to a rotatable cutting bit having a cutting tip brazed to a depending tool body for cutting substrate such as asphalted roadway surfaces and mineral formations.

BACKGROUND

Cutting bits that are used in mining and construction applications for removing mineral deposits and road surfaces respectively, are typically mounted in a machine having a power-driven cutter wheel or drum. Typically, an array of cutting bits are mounted and secured within sockets on the rim of the wheel or a stationary block holder on the drum. Cutting bits may be rotatable or non-rotatable within their sockets or blocks.

SUMMARY

A rotatable cutting bit having a cutting tip brazed to a tool body is provided, where a mass of brazing alloy extends outwardly from within a first cavity located in a head portion of the tool body and a second cavity located in a base portion of the cutting tip into a gap between the head portion and the base portion.

In another aspect, the brazing alloy has a concave cross section within the first cavity and the second cavity of the rotatable cutting tip that is brazed.

In another aspect, a majority of the mass of the brazing alloy is located within the first cavity and the second cavity of the rotatable cutting tip that is brazed.

In one aspect, a rotatable cutting bit is provided with a cutting tip brazed to a tool body, where a mass of brazed alloy extends flush with an exterior surface of a head portion of the tool body that has a first outer diameter that is substantially equal in measurement to a second outer diameter of a base portion of the cutting tip.

In one aspect, a method is providing having the steps of: (a) inserting a mass of brazing alloy into a first cavity in a head portion of a tool body, where a portion of the mass of brazing alloy protrudes from the tool body; (b) mounting a base portion of a cutting tip onto the tool body by aligning a second cavity with the portion of the mass of brazing alloy that protrudes from the tool body; and (c) brazing the cutting tip to the tool body with the mass of brazing alloy to form a rotatable cutting bit.

In one aspect, a method is provided having the steps of: (a) keying, with a mass of brazing alloy, a first cavity of a tool body with a second cavity of a cutting tip; and (b) brazing, with the mass of brazing alloy, the cutting tip to the tool body to form a rotatable cutting bit.

In one aspect, a method is provided having the steps of: (a) positioning a mass of brazing alloy between a first cavity of a tool body and a second cavity of a cutting tip; (b) mounting the cutting tip upon the tool body in a final position relative to the tool body with a defined gap between the cutting tip and the tool body; and (c) brazing, with the mass of brazing alloy, the cutting tip to the tool body to form a rotatable cutting bit.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

BRIEF DESCRIPTION OF DRAWINGS

Aspects are illustrated by way of example, and not by way of limitation, in the accompanying drawings, wherein.

DETAILED DESCRIPTION

Rotatable cutting bits experience wear in a number of ways due to the harsh environments in which they operate and must be frequently replaced. Provided is a rotatable cutting bit that permits wear on the bit to be distributed evenly so as to maintain sharpness while cutting into material to be broken. The rotatable cutting bit may have a tool body formed from a cold heading process and a cutting tip that may be made of tungsten carbide. An outer diameter of a head portion of the tool body may be substantially equal to an outer diameter of a base portion of the cutting tip. Manufacture of the rotatable cutting bit involves brazing the cutting tip to the tool body with a mass of brazing alloy. The mass of brazing alloy is predominantly enclosed by bonding surfaces of the cutting tip and the tool body prior to brazing. The mass of brazing alloy keys aligns the cutting tip and the tool body into final immovable positions. The assembly is heated to a temperature at which the mass of brazing alloy melts and flows outwards into a gap between the two components. An even and effective bond is created between the cutting tip and the tool body.

A first cavity is disposed in the head portion of the tool body. The mass of brazing alloy may be inserted and partially received into the first cavity. A portion of the mass of brazing alloy may protrude outwards from the first cavity disposed in the head portion. The cutting tip may be mounted upon the tool body in a final position relative to the tool body. In the final position, a plurality of pegs disposed on a base portion of the cutting tip may contact the head portion of the tool body.

A second cavity is disposed in the base portion of the cutting tip. The portion of the mass of brazing alloy protruding outwards from the tool body may be partially received by the second cavity of the cutting tip. The cutting tip mounted upon the tool body is keyed into the final position with the mass of brazing alloy. Central axes of the second cavity, the mass of brazing alloy, and the first cavity centrally disposed align within a central longitudinal axis of the tool body.

The rotatable cutting bit forms by brazing the cutting tip to the tool body with the mass of brazing alloy. Induction heating or a furnace may heat the cutting tip, the tool body, and the mass of brazing alloy. The mass of brazing alloy melts outwardly from within the first cavity and the second cavity into a gap defined by the plurality of pegs and hardens between the base portion and the head portion without lateral or vertical movement between the cutting tip and the tool body.

Figure 1:
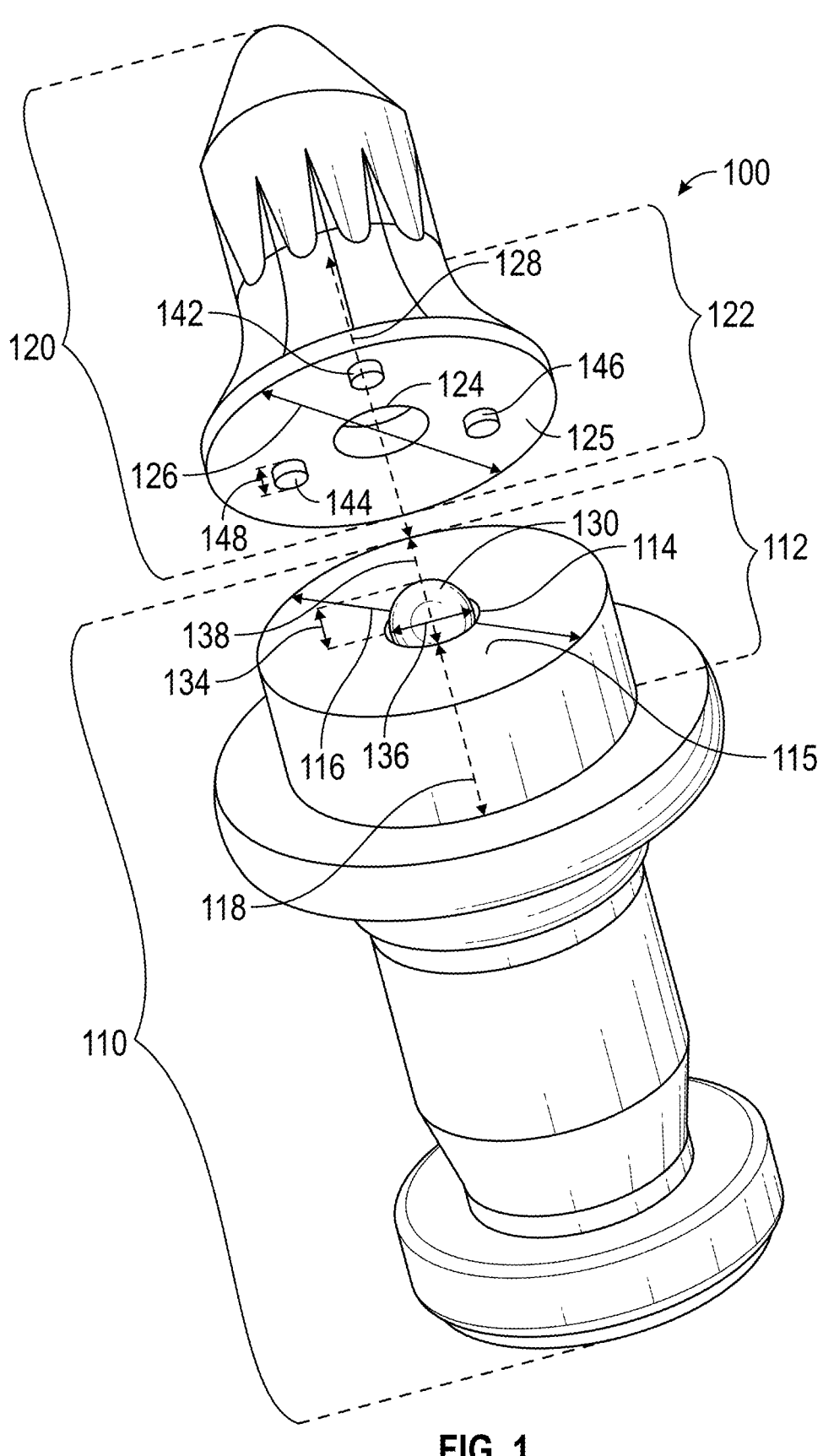
FIG. 1 depicts a side perspective view of a rotatable cutting bit with a cutting tip separated from a tool body to expose a mass of brazing alloy inserted into a first cavity.

Now referring to the drawings, FIG. 1 shows example components for a rotatable cutting bit 100 in an unassembled configuration. A cutting tip 120 is shown separated to expose a mass of brazing alloy 130 disposed in a tool body 110 of the rotatable cutting bit 100.

Tool body 110 is a generally elongated steel mass having a cylindrical geometry that may be net shaped. Geometric features shaped along the exterior surface of the tool body 110 may be formed during a cold heading process—also known as cold forming-which is a quick and efficient method for producing the components of the rotatable cutting bit. The net shape of the tool body 110 may be formed from a blank (such as a stock piece of material cut from metal wire) during the cold heading process, which may be multi-stage. A punch and a die of the cold heading machine may form the cylindrical blank piece into the geometry (or configuration) as illustrated. The die may be segmented, where each unit of the die and punch contains a geometry that forms the net shape of the tool body 110. Grain direction of the metal material (e.g. steel) generally follows the contour of the exterior surface of the tool body 110 formed. The tool body formed by cold heading possesses increased strength as compared to a tool body in which some portions are machined out. The tool body 110 formed has an axially forward end and an opposite axially rearward end.

The head portion 112 is disposed at the axial forward end of tool body 110. The head portion 112 may be cylindrical in shape with a smaller diameter than a depending flange of the tool body 110. The head portion 112 defines a first outer diameter 116 of the tool body 110 and a substantially flat, forward-facing circular face at the forward end of the tool body 110. The curved, exterior surface of the head portion 112 is generally parallel with a central longitudinal axis 250 of the tool body 110. The outside leading edge of the head portion 112 between the circular face and the exterior surface may be squared or beveled. In the example shown, the outside leading edge of the head portion 112 is square. Cutting tips of multiple diameters may be mounted to a tool body having a head portion that is substantially flat without any socket walls.

Head portion 112 of tool body 110 includes a first cavity 114 extending rearward generally from the flat, forward-facing circular face-referred to hereafter as a forward bonding surface 115—into an interior of the head portion 112 of the tool body 110. The first cavity 114 is defined by a cavity wall that terminates at the forward bonding surface 115. The transition of the cavity wall between the bottom and the termination point at the forward bonding surface 115 may be smooth and seamless. Such transition may avoid introducing stress concentrations or stress risers when a load is applied to the tool body 110.

The first cavity 114 may be hemispherical so that the cavity wall continuously slopes from the bottom to the termination point at the forward bonding surface 115. The first cavity 114 is located radially inward from the circumference of the forward bonding surface 115. In one example, the radius of the first cavity 114 may be approximately 0.125 inch+/−0.03 inch (approx. 0.3 centimeter+/−0.08 centimeters). The first cavity 114 has a nominal diameter measured across opposing junctions of the cavity wall at the forward bonding surface 115 of the tool body 110. The first cavity 114 may be centered with respect to a first outer diameter 116 of the head portion 112. Inclusion of the first cavity 114 reduces the amount of material used to form the tool body 110, as compared to designs having a protrusion extending outwards from the tool body, or solid tool bodies without a cavity. Therefore, it may be desirable for the first cavity 114 to have as large a diameter as desired without impairing the ability of the tool body 110 to withstand the stresses imposed during cutting operations.

In one example, the first cavity 114 disposed in the forward bonding surface 115 may be formed with a punch during the cold heading process. The punch may be positioned relative to the die so that the first cavity 114 is centrally located in alignment with the central longitudinal axis 250 of the tool body 110. Under influence of the movement of the punch the metal in the forward bonding surface 115 is pushed towards the axial rearward end of the tool body 110. Alternatively, the first cavity 114 may be formed by another manufacturing process such as by drilling, milling, molding, etc.

The cutting tip 120 made of hard or super hard material, such as tungsten carbide, may be formed by powder metallurgy processes then hardened. The cutting tip 120 may have a conically shaped tip portion, a base portion 122, and an intermediate portion between the tip portion and the base portion 122. A maximum diameter of the tip section is smaller than the outer diameter of the base portion 122. The cutting tip 120 is fixedly secured to the axial forward end of the tool body 110. The base portion 122 of the cutting tip 120 may be secured to the net-shaped steel body at the head portion 112 by brazing or the like.

Base portion 122 generally has a flat, rearward-facing circular face-referred to hereafter as a rearward bonding surface 125—for bonding the cutting tip 120 to the head portion 112 of the tool body 110 to form the rotatable cutting bit 100. The base portion 122 defines a second outer diameter 126 at the rearward end of the cutting tip 120 and the rearward bonding surface 125. Alternatively, in harsher environments, a cutting tip that utilizes a protruded or complementary "valve seat" shaped bonding surface may be preferred to withstand higher shear stresses than a cutting tip having a "flat bottom" shaped bonding surface without becoming dislodged from the tool body 110.

The cutting tip 120 includes a second cavity 124 extending axially forward into an interior of the base portion 122 from the rearward bonding surface 125 of the cutting tip 120. The second cavity 124 is defined by a cavity wall that terminates at the rearward bonding surface 125. The transition of the cavity wall between the crown and the termination point at the rearward bonding surface 125 may be smooth and seamless. Such transition may avoid introducing stress concentrations or stress risers when a load is applied to the cutting tip 120.

The second cavity 124 may be hemispherical so that the cavity wall continuously slopes from the crown to the termination point at the rearward bonding surface 125. The second cavity 124 is located radially inward from the circumference of the rearward bonding surface 125. In one example, the radius of the second cavity 124 may be approximately 0.125 inch+/−0.03 inch (approx. 0.3 centimeter+/−0.08 centimeters). The second cavity 124 has a nominal diameter measured across opposing junctions of the cavity wall at the rearward bonding surface 125. The second cavity 124 may be centered with respect to a second outer diameter 126 of the cutting tip 120. Inclusion of the second cavity 124 reduces the amount of expensive carbide material used to form the cutting tip 120, as compared to solid carbide tips without a cavity. Therefore, it may be desirable for cavity 124 to have as large a diameter as desired without impairing the ability of the cutting tip 120 to withstand the stresses imposed during cutting operations. The second cavity 124 has a diameter equal to or substantially equal to the diameter of the first cavity 114.

The diametrically opposing cavities disposed partially into the bonding surfaces of the tool body 110 and the cutting tip 120 may be of any shape having substantially equal dimensions. In one example, cavity walls are shaped as concavities. In this example, the cavity walls are substantially hemispherical in shape. In another example, the cavity walls are substantially cylindrical in shape. In another example, the cavity walls have a plurality of projections and notches. Projections and notches on cavity walls may key with a mass of brazing alloy 130 having a complementary shape and is inserted between the tool body 110 and the cutting tip 120. In one example, the cavity walls are inwardly tapered at an angle with respect to the central longitudinal axis 250 so that the first cavity 114 and the second cavity 124 are widest at the forward bonding surface 115 and the rearward bonding surface 125, respectively, and narrowest at their crowns. Tapering cavity walls may facilitate removal of the components from a mandrel that is used to form components during machining or when components are molded or formed under pressure.

The brazing alloy 130 may be a spherical mass or ball of metal alloy formed by cold heading. In one example, the outer diameter 136 of the spherical ball of brazing alloy 130 may be approximately 0.25 inch+/−0.06 inch (approx. 0.64 centimeter+/−0.15 centimeters). The spherical ball of brazing alloy 130 may be formed from a coil of braze wire made of brazing alloy 130. The brazing alloy 130 may be a mixture of two or more metals or be a pure metal used as the brazing filler metal. The braze wire may be cut into braze rods of brazing alloy 130 with fixed lengths. A high-speed ball heading machine may be utilized to set the braze rod into a die to press the braze rod of brazing alloy 130 into a spherical shape. Many spherical balls of brazing alloy 130 may be produced with the high-speed ball heading machine. The spherical ball of brazing alloy 130 may undergo further finishing, if needed, to produce a completely smooth and rounded ball without any burrs or uneven surface projections. Having a majority of the surface of the spherical ball of brazing alloy 130 within the outer diameter 136 of the spherical ball may assist alignment within the first cavity 114 of the tool body 110 and the second cavity 124 the cutting tip 120. It is also contemplated that the rotatable cutting tip may have multiple braze ball locators where multiple paired cavities are disposed in the head portion 112 of the tool body 110 and the base portion 122 of the cutting tip 120. Also, the masses of brazing alloy may have other complementary shapes to fit cavities formed with shapes such as an oblate hemispherical, cylindrical, pyramidal, square-shaped, or rod-shaped cavity space.

In the assembled configuration, the mass of brazing alloy 130 extends axially rearward past at least a portion of the forward bonding surface 115 of the tool body 110 and extends axially forward past at least a portion of the rearward bonding surface 125 of the cutting tip 120. In one example, approximately 50% of the mass of brazing alloy 130 extends axially rearward into the first cavity 114 and approximately 50% of the mass of brazing alloy 130 extends axially rearward into the second cavity 124. In another example, approximately 60% of the mass of brazing alloy 130 extends axially rearward into the first cavity 114 and approximately 40% of the mass of brazing alloy 130 extends axially rearward into the second cavity 124. In another example, approximately 75% of the mass of brazing alloy 130 extends axially rearward into the first cavity 114 and approximately 25% of the mass of brazing alloy 130 extends axially rearward into the second cavity 124. In another example, approximately 40% of the mass of brazing alloy 130 extends axially rearward into the first cavity 114 and approximately 60% of the mass of brazing alloy 130 extends axially rearward into the second cavity 124. The mass of brazing alloy 130 extending past the head portion 112 of the tool body 110 and the base portion 122 of the cutting tip 120 provides a self-centering feature to facilitate the assembly and bonding process by holding the tool body 110 and the cutting tip 120 in desired final positions.

Figures 2, 3:
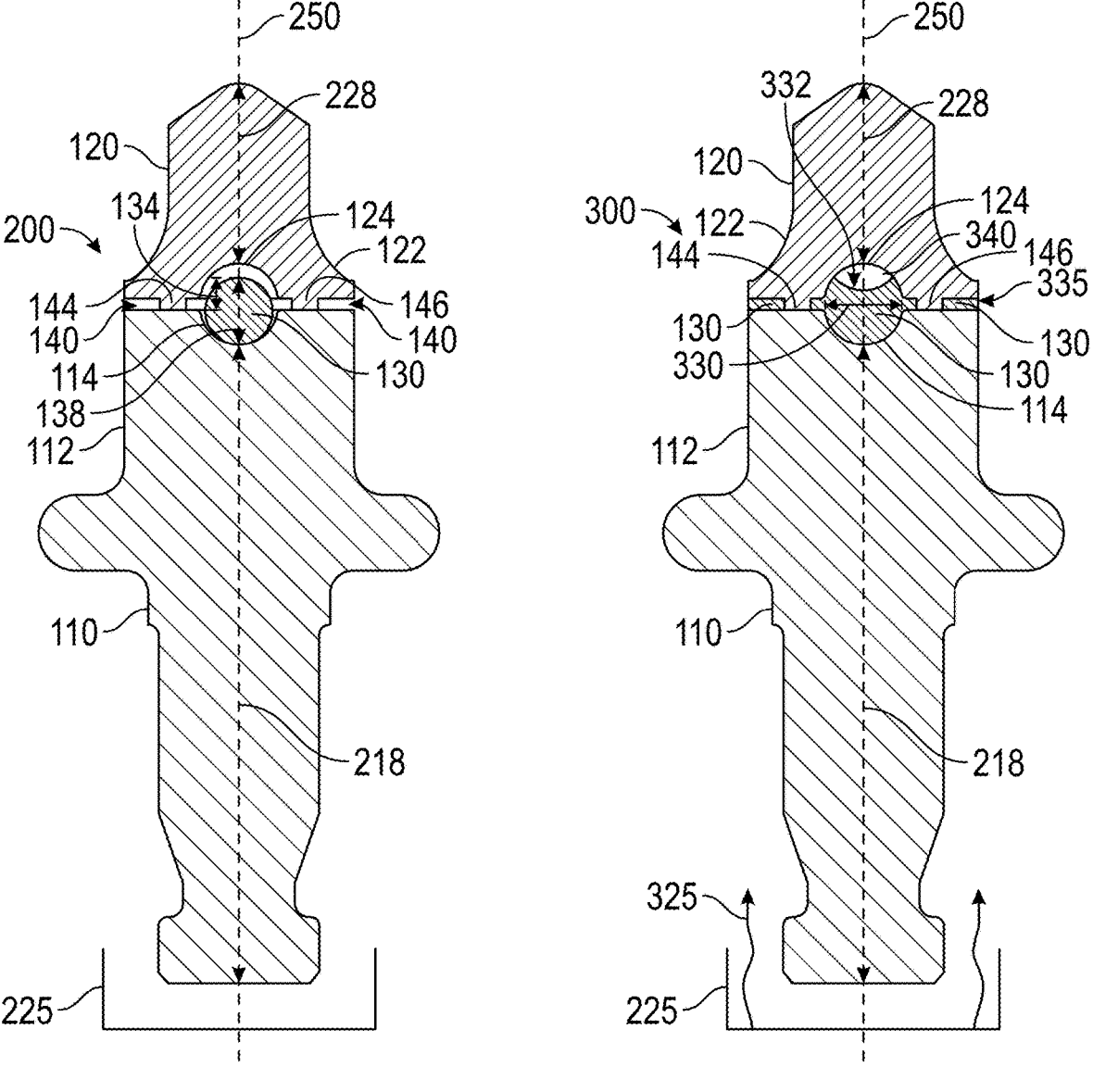
FIG. 2 depicts a side cross-sectional view of the rotatable cutting bit of FIG. 1 with the cutting tip, the mass of brazing alloy, and the tool body in an assembled configuration.
FIG. 3 depicts a side cross-sectional view of the rotatable cutting bit of FIG. 1 with the cutting tip brazed to the tool body with the brazing alloy in a bonded configuration.

FIG. 2 depicts a cross-sectional view of the rotatable cutting bit 100 in the assembled configuration showing installation of the cutting tip 120 onto the tool body 110 prior to the mass of brazing alloy 130 being bonded to the base portion 122 and the head portion 112. The mass of brazing alloy 130 partially disposed in the first cavity 114 may extend axially forward the forward bonding surface 115 of the head portion 112 of the tool body 110.

As shown in FIG. 1 and FIG. 2, a protruding portion 134 of the mass of brazing alloy 130 is received into the second cavity 124 when the cutting tip 120 is mounted upon the tool body 110. When mounted, a portion of the forward bonding surface 115 of the tool body 110 mates with a portion of the rearward bonding surface 125 of the cutting tip 120. The protruding portion 134 of the mass of brazing alloy 130 may extend forward from the forward bonding surface 115 of the head portion 112 by an insert distance.

The insert distance of the protruding portion 134 of the mass of brazing alloy 130 may be approximately equal to the depth of the second cavity 124 in the cutting tip 120. As depicted in FIG. 2, the protruding portion 134 of the mass of brazing alloy 130 may be shorter than the depth of the second cavity 124 so that the protruding portion 134 of the mass of brazing alloy 130 does not extend all the way into the second cavity 124. The protruding portion 134 of the mass of brazing alloy 130 engages the second cavity 124 to prevent lateral movement of the cutting tip 120 with respect to the tool body 110 during assembly. In addition, engagement between the protruding portion 134 and the second cavity 124 aligns and centers the cutting tip 120 even with the forward bonding surface 115 lacking a recess or socket to aid in preventing lateral movement of the cutting tip 120.

The mass of brazing alloy 130 received into the first cavity 114 and the second cavity 124 increases coaxial alignment between centers of the cutting tip 120 and the tool body 110. Central axis 118 of the first cavity 114 and central axis 128 of the second cavity 124 may be coaxially aligned within the central longitudinal axis 250 of the rotatable cutting bit that is assembled. Mating the cavities together with a complementary shaped mass of brazing alloy 130 increases coaxial alignment between components of the rotatable cutting bit without distortions to final positions of the components. Aligning the central axis 138 of the mass of brazing alloy 130 within the central longitudinal axis 250 potentially increases wear life of the bond made between the tool body 110 and the cutting tip 120.

As shown in FIG. 2, a gap 140 exists between the base portion 122 of the cutting tip 120 and the head portion 112 of the tool body 110 assembled together. The gap 140 provides a small clearance between the head portion 112 and the base portion 122 for the flow of brazing material or other bonding material. The gap 140 may inhibit movement of the cutting tip 120 with respect to the tool body 110 as the brazing alloy 130 bonds the rearward bonding surface 125 of the cutting tip 120 with the forward bonding surface 115 of the tool body 110. The gap between the protruding portion 134 of the mass of brazing alloy 130 and the cavity wall of the second cavity 124 may be approximately equal to an expansion distance of the brazing alloy 130 when heated. Alternatively, the exterior surface of the mass of brazing alloy 130 and cavity walls of the first cavity 114 and the second cavity 124 may engage in a snug fit so that the cutting tip 120 has to be pressed onto the tool body 110.

The cutting tip 120 is attached to the base portion 122 of the tool body 110 by a bonding process including, but not limited to, one or more material bonding of welding, brazing, soldering, gluing, and adhesive bonding. The welding, brazing, soldering, or adhesive bonding occurs along at least a portion of the bonding interface between the rearward bonding surface 125 of the cutting tip 120 and the forward bonding surface 115 of the tool body 110 to fix the base portion 122 of the cutting tip 120 to the head portion 112 of the tool body 110. Bonding may also occur between the cavity walls of the first cavity 114 and the second cavity 124 with the brazing alloy 130.

As shown, a plurality of pegs 142, 144, 146 extend outwardly rearward from the base portion 122 of the cutting tip 120. In one example, the height of the plurality of pegs 142, 144, 146 may be approximately 0.008 inch+/−0.005 inch (approx. 0.02 centimeter+/−0.013 centimeter). In one example, the diameter of the plurality of pegs 142, 144, 146 may be approximately 0.1 inch+/−0.03 inch (approx. 0.3 centimeter+/−0.08 centimeters). The plurality of pegs 142, 144, 146 may be cylindrical. Figures depict the plurality of pegs 144, 146 of the cutting tip 120 in contact with the head portion 112 of the tool body 110. The plurality of pegs 142, 144, 146 define a gap distance 148 between the cutting tip 120 and the tool body 110 which controls braze line thickness.

The cutting tip 120 may be brazed to the tool body 110 at the head portion 112 to provide a robust bond between the components. Pressure may be applied to the cutting tip 120 to hold it in final position with the tool body 110 as the brazing process occurs. A heat source 225 May provide the heating 325 to conduct the brazing process. The heat source 225 may be a furnace. Heating 325 of the cutting tip 120, the tool body 110, and the mass of brazing alloy 130 may occur together in a furnace. The bonding surfaces of the components may be fluxed first with air induction by the furnace heating the fluxed components. Alternatively, components of the rotatable cutting bit may be bonded together by heating from induction. With induction, separate components of the rotatable cutting bit may be heated differentially due to differences in heating and expansion rates of varied component materials.

FIG. 3 depicts a cross-sectional view of the rotatable cutting bit 300 in a bonded configuration showing the cutting tip 120 brazed to the tool body 110 with the brazing alloy 130 by heating 325 provided from the heat source 225. The rotatable cutting bit 300 is heated so that the brazing alloy 130 melts and flows outwardly (as shown by double arrow movement line 330) from within the first cavity 114 and the second cavity 124. The brazing alloy 130 flows into the gap 140 defined by the plurality of pegs 142, 144, 146 between the head portion 112 and the base portion 122. The brazing alloy 130 received into the gap 140 hardens with a braze line thickness equal to the gap distance 148. The brazing alloy 130 that is hardened secures the cutting tip 120 to the axial forward end of the tool body 110 without lateral or vertical movement between the cutting tip 120 and the tool body 110 from the assembled configuration.

In the cross section depicted in FIG. 3, a braze surface 332 of the brazing alloy 130 is shown outwardly sloped from the first cavity 114 into the second cavity 124 of the rotatable cutting bit 300 that is brazed. Melted braze adhering to the cavity walls while flowing outward and upward by capillary action during the brazing process may cause the braze surface 332 to be concavely curved within the cavity space, thereby forming a braze void 340 that is centrally located in the crown of the cavity space. The brazing alloy 130 in contact with the cavity walls of the first cavity 114 and the second cavity 124 may increase the effective surface area over which the bonding occurs. Therefore, a stronger bond may result from the bonding process than that of a conventional surface mounting without cavities. The arrangement of mating cavities with the brazing alloy 130 may increase wear life of the cutting tip 120 for at least the reason that the brazing alloy 130 extends axially forward past at least the rearward bonding surface 125 into the base portion 122 of the cutting tip 120 and axially rearward past at least the forward bonding surface 115 into the head portion 112 of the tool body 110. Such configuration may counteract forces generated during cutting operations, particularly lateral forces acting on the cutting tip 120.

As shown in FIG. 3, the brazing alloy 130 with a concave cross section within the first cavity 114 and the second cavity 124 extends outwardly from within the first cavity 114 and the second cavity 124 into the gap 140 between the head portion 112 and the base portion 122. A majority of the mass of the brazing alloy 130 is located within the first cavity 114 and the second cavity 124 of the rotatable cutting bit 300 depicted. In another example, the majority of the mass of the brazing alloy 130 may be located within the gap 140 between the cutting tip 120 and the tool body 110 of the rotatable cutting bit 300. The base portion 122 of the cutting tip 120 is positioned upon the mass of brazing alloy 130 and brazed so that the braze flows outward from the diametrically opposed cavities into the gap 140 and around the plurality of pegs 142, 144, 146 towards the exterior surface 335 of the rotatable cutting bit 300. A majority of the mass of the brazing alloy 130 may be located within the first cavity 114 and the second cavity 124 of the rotatable cutting bit 300 that is brazed.

Mating cavities with the brazing alloy 130 provides a self-centering feature which facilitates the bonding process by keying the cutting tip 120 and the tool body 110 in desired final positions. The cutting tip 120 is fixedly secured to the forward end of tool body 110 so that central axes 118, 128 of the first cavity 114 and the second cavity 124, respectively, are coaxially aligned with a central longitudinal axis 250 of the rotatable cutting bit 300 in the bonded configuration. Coaxial alignment of components may promote even wearing and increased useful tool life of the rotatable cutting bit though exposed to harsh cutting environment during cutting operations.

Conventional geometry of head portions of tool bodies suffer from using an excess amount of steel material to prevent difficulties during assembly of rotatable cutting bits. Tool bodies of the conventional type generally have head portions with a socket shaped bonding surface for receiving and mounting the cutting tip to the forward end of the tool body. Sockets in tool bodies of the conventional type are generally flat-bottomed with vertical sidewalls extending forward from the socket edges to position the base portion of the cutting tip on the forward end of the tool body to form the rotatable cutting bit.

Tool bodies of the socket design require more material since the socket is formed by solid retention sidewalls of the head portion having a greater diameter than a diameter of the base portion of the cutting bit. The conventional design significantly increases the volume of tool body material required. Additionally, the socket design suffering from the use of excess material requires more power input during cutting operations where substrate that is less hard does not wear away the excess socket walls as quickly as occurs in hard substrates. The socket wall material does not contribute to the cutting performance of the rotatable cutting bit because the socket wall used for retaining the cutting bit during bonding process wears away well before the cutting bit loses effectiveness by wear processes during cutting operations.

In contrast, the head portion 112 of the tool body 110 has a first outer diameter 116 that is substantially equal to a second outer diameter 126 of the base portion 122 of the cutting tip 120. Reducing the first outer diameter 116 avoids needing excess material to form retention sidewalls for the socket in the head portion of the tool body. Additionally, having the first outer diameter 116 of the head portion 112 substantially equal with the second outer diameter 126 of the base portion 122 may provide less resistance to substrate encountered during cutting. Additionally, having the first outer diameter 116 of the head portion 112 and the second outer diameter 126 of the base portion 122 substantially equal provides an exterior surface 335 of the rotatable cutting bit 300 that is cylindrical and flush from the base portion 122 of the cutting tip 120 across the braze line to the head portion 112 of the tool body 110.

The exterior surface 335 at the braze line that is cylindrical and flush across the base portion 122 of cutting tip 120 and the head portion 112 of tool body 110 maximizes cutting efficiency by allowing a minimum of tool body material which could interfere with cutting operations. The flush design also eliminates wasteful production costs by decreasing the amount of metal resources used in formation of the head portion 112 of the tool body 110. Affixing the cutting tip 120 to the tool body 110 without the need for a cutting bit socket disposed in the head portion 112 for retention of the base portion 122 removes the wasteful practice of having socket walls extending forward from the head portion of the tool body to overlap the base portion of the cutting tip. Socket walls on typical rotatable cutting bits are often worn away within the first minutes of cutting operations. Therefore, permitting exterior sidewalls of the head portion 112 to be substantially flush with exterior sidewalls of the base portion 122 along the exterior surface 335 eliminates extra tool body materials and wasteful practices.

In one method, the rotatable cutting bit 300 is brazed so that central axes 218, 228 of the tool body and the cutting tip, respectively, are aligned along a central longitudinal axis 250 of the rotatable cutting bit 300. A mass of brazing alloy 130 is inserted into a first cavity 114 in a head portion 112 of the tool body 110. The first cavity 114 is centrally disposed within the central longitudinal axis 250 of the rotatable cutting bit 200. A protruding portion 134 of the mass of brazing alloy 130 inserted into the first cavity 114 protrudes outwardly from a forward bonding surface 115 of the tool body 110. A base portion 122 of a cutting tip 120 is mounted onto the tool body 110 by aligning a second cavity 124 with the protruding portion 134 of the mass of brazing alloy 130 that protrudes from the tool body 110. The cutting tip 120 is brazed to the tool body 110 with the mass of brazing alloy 130 to form a rotatable cutting bit 300 that is bonded. During brazing, the mass of brazing alloy 130 extends outward from within the first cavity 114 and the second cavity 124 into a gap 140 between the head portion 112 and the base portion 122.

In another method, a cutting tip 120 is keyed to a tool body 110 so that central axes 228, 218 align with a central longitudinal axis 250 of the assembled rotatable cutting bit 200. A mass of brazing alloy 130 is inserted within a first cavity 114 of the tool body 110 and a second cavity 124 of the cutting tip 120. The mass of brazing alloy 130 is received into the first cavity 114 and the second cavity 124 to align the cutting tip 120 with the tool body 110. The mass of brazing alloy 130 is partially received by the first cavity 114 and partially received by the second cavity 124. The first cavity 114 of the tool body 110 is keyed to the second cavity 124 of the cutting tip 120 with the mass of brazing alloy 130. The mass of brazing alloy 130 within the first cavity 114 and the second cavity 124 is melted outwardly into a gap 140 between the tool body 110 and the cutting tip 120. The cutting tip 120 is brazed to the tool body 110 with the mass of brazing alloy 130 to form a rotatable cutting bit 300 that is brazed. The mass of brazing alloy 130 extends outwardly from within the first cavity 114 and the second cavity 124 into a gap 140 between a head portion 112 of the tool body 110 and a base portion 122 of the cutting tip 120. Central axes 118, 138, 128 of the first cavity 114, the mass of brazing alloy 130, and the second cavity 124 are centrally disposed within a central longitudinal axis 250 of the assembled or bonded rotatable cutting bit.

In another method, a cutting tip 120 is mounted and brazed into a final immovable position relative to a tool body 110. A mass of brazing alloy 130 is positioned between a first cavity 114 of the tool body 110 and a second cavity 124 of the cutting tip 120. A base portion 122 of the cutting tip 120 is contacted with a head portion 112 of the tool body 110. The cutting tip 120 has a plurality of pegs 142, 144, 146 that extend outwardly from the rearward bonding surface 125 of the base portion 122. The cutting tip 120 is keyed upon the tool body 110 in a final position with the mass of brazing alloy 130. The cutting tip 120 mounted upon the tool body 110 in the final position relative to the tool body 110 has a gap 140 defined between the cutting tip 120 and the tool body 110. The cutting tip 120, the tool body 110, and the mass of brazing alloy 130 are heated. During heating, a heat source 225 may supply heating 325 via a furnace or by induction. The cutting tip 120 is brazed to the tool body 110 with the mass of brazing alloy 130 to form a rotatable cutting bit 300 that is brazed. The mass of brazing alloy 130 extends outwardly into the gap 140 defined by the plurality of pegs 142, 144, 146 between the base portion 122 and the head portion 112.

The cutting tip 120 is brazed to the tool body 110 with the mass of brazing alloy 130 to form a rotatable cutting bit 300 that is brazed. The mass of brazing alloy 130 extends outwardly into the gap 140 defined by the plurality of dimples 142, 144, 146 between the base portion 122 and the head portion 112.

Clause 1. A rotatable cutting bit comprising: (a) a tool body comprising: (i) a head portion; (ii) a first cavity in the head portion; (b) a cutting tip comprising: (i) a base portion; (ii) a second cavity in the base portion; and (c) wherein the cutting tip is brazed to the tool body with a brazing alloy that extends outwardly from within the first cavity and the second cavity into a gap between the head portion and the base portion.

Clause 2. The rotatable cutting bit of clause 1, wherein the first cavity and the second cavity are substantially equal in dimensions.

Clause 3. The rotatable cutting bit of clause 1, wherein the central axes of the first cavity and the second cavity are aligned within the central longitudinal axis of the rotatable cutting bit that is brazed.

Clause 4. The rotatable cutting bit of clause 1, wherein an exterior surface of the rotatable cutting bit is flush across the base portion of the cutting tip brazed to the head portion of the tool body.

Clause 5. The rotatable cutting bit of clause 1, wherein the brazing alloy is outwardly sloped from the first cavity into the second cavity of the rotatable cutting bit that is brazed.

Clause 6. The rotatable cutting bit of clause 1, wherein the brazing alloy has a concave cross section within the first cavity and the second cavity of the rotatable cutting bit that is brazed.

Clause 7. The rotatable cutting bit of clause 1, wherein a majority of the brazing alloy is located within the first cavity and the second cavity of the rotatable cutting bit that is brazed.

Clause 8. A rotatable cutting bit comprising: (a) a tool body comprising: (i) a head portion having a first outer diameter; (b) a cutting tip comprising: (i) a base portion having a second outer diameter; and (c) wherein the first outer diameter of the head portion and the second outer diameter of the base portion are substantially equal so that an exterior surface of the rotatable cutting bit from the base portion of the cutting tip that is brazed to the head portion of the tool body is flush.

Clause 9. The rotatable cutting bit of clause 8, wherein the tool body is formed from a cold heading process.

Clause 10. The rotatable cutting bit of clause 8, wherein: (a) the tool body further comprises: (i) a first cavity in the head portion; (b) the cutting tip further comprises: (i) a second cavity in the base portion; and (c) a brazing alloy extending outwardly from within the first cavity and the second cavity into a gap between the head portion and the base portion.

Clause 11. The rotatable cutting bit of clause 10, wherein a majority of the brazing alloy is located within the first cavity and the second cavity of the rotatable cutting bit that is brazed.

Clause 12. A rotatable cutting bit comprising: (a) a tool body having a first cavity in a head portion; (b) a cutting tip having a second cavity in a base portion; (c) a gap between the head portion and the base portion; and (d) a mass of brazing alloy that extends outwardly from within the first cavity and the second cavity into the gap between the head portion and the base portion.

Clause 13. A method comprising the steps of: (a) inserting a mass of brazing alloy into a first cavity in a head portion of a tool body, wherein a portion of the mass of brazing alloy protrudes from the tool body; (b) mounting a base portion of a cutting tip onto the tool body by aligning a second cavity with the portion of the mass of brazing alloy that protrudes from the tool body; and (c) brazing the cutting tip to the tool body with the mass of brazing alloy to form a rotatable cutting bit.

Clause 14. The method of clause 13, wherein the first cavity is centrally disposed within a central longitudinal axis of the rotatable cutting bit.

Clause 15. The method of clause 13, wherein during the step of brazing, the mass of brazing alloy extends outward from within the first cavity and the second cavity into a gap between the head portion and the base portion.

Clause 16. A method comprising the steps of: (a) keying, with a mass of brazing alloy, a first cavity of a tool body with a second cavity of a cutting tip; and (b) brazing, with the mass of brazing alloy, the cutting tip to the tool body to form a rotatable cutting bit.

Clause 17. The method of clause 16, further comprising the step of: (a) receiving the mass of brazing alloy into the first cavity and second cavity to align the tool body with the cutting tip.

Clause 18. The method of clause 16, wherein central axes of the first cavity, the mass of brazing alloy, and the second cavity are centrally disposed within a central longitudinal axis of the rotatable cutting bit.

Clause 19. The method of clause 16, further comprising the step of: (a) melting the mass of brazing alloy within the first cavity and the second cavity outwardly into a gap between the tool body and the cutting tip.

Clause 20. The method of clause 16, further comprising the step of: (a) inserting the mass of brazing alloy within the first cavity and the second cavity.

Clause 21. The method of clause 16, wherein the step of keying, the mass of brazing alloy is partially received by the first cavity and partially received by the second cavity.

Clause 22. The method of clause 16, wherein the step of brazing, the mass of brazing alloy extends outwardly from within the first cavity and the second cavity into a gap between the tool body and the cutting tip.

Clause 23. A method comprising the steps of: (a) positioning a mass of brazing alloy between a first cavity of a tool body and a second cavity of a cutting tip; (b) mounting the cutting tip upon the tool body in a final position relative to the tool body with a defined gap between the cutting tip and the tool body; and (c) brazing, with the mass of brazing alloy, the cutting tip to the tool body to form a rotatable cutting bit.

Clause 24. The method of clause 23, further comprising the step of: (a) keying the cutting tip upon the tool body in the final position with the mass of brazing alloy.

Clause 25. The method of clause 23, further comprising the steps of: (a) contacting a base portion of the cutting tip with a head portion of the tool body, wherein the cutting tip has pegs that extend outwardly from the base portion; and (b) wherein the step of brazing, the mass of brazing alloy extends outwardly into a gap defined by the pegs between the base portion and the head portion.

Clause 26. The method of clause 23, further comprising the step of: (a) heating the cutting tip, the tool body, and the mass of brazing alloy with a furnace.

Clause 27. The method of clause 26, wherein the step of heating occurs by furnace heating.

Clause 28. The method of clause 26, wherein the step of heating occurs by induction.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications May be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

I claim:

1. A method comprising the steps of:
inserting a solid mass of brazing alloy into a first cavity in a head portion of a tool body, wherein a portion of the solid mass of brazing alloy protrudes from the tool body;
mounting a base portion of a cutting tip onto the tool body in final position, prior to brazing, by mechanically aligning the first cavity and a second cavity in the base portion using the portion of the solid mass of brazing alloy that protrudes from the tool body; and
brazing the cutting tip to the tool body with the mass of brazing alloy to form a rotatable cutting bit.

2. The method of claim 1, wherein the first cavity and the second cavity are substantially equal in dimensions.

3. The method of claim 1, wherein during the step of brazing, the solid mass of brazing alloy melts outward from within the first cavity and the second cavity into a gap between the head portion and the base portion.

4. A method comprising the steps of:
aligning, with a solid mass of brazing alloy, a first cavity of a tool body with a second cavity of a cutting tip into final position prior to brazing, wherein a portion of the solid mass of brazing alloy protrudes from the first cavity and engages the second cavity to prevent lateral movement of the cutting tip relative to the tool body during assembly; and brazing, with the mass of brazing alloy, the cutting tip to the tool body to form a rotatable cutting bit.

5. The method of claim 4, further comprising the step of:
receiving the solid mass of brazing alloy into the first cavity and the second cavity by insertion to align the tool body with the cutting tip.

6. The method of claim 4, further comprising the step of:
aligning the first cavity and the second cavity coaxially with the solid mass of brazing alloy.

7. The method of claim 4, wherein central axes of the first cavity, the solid mass of brazing alloy, and the second cavity are centrally disposed within a central longitudinal axis of the rotatable cutting bit.

8. The method of claim 4, further comprising the step of:
melting the solid mass of brazing alloy within the first cavity and the second cavity outwardly into a gap between the tool body and the cutting tip.

9. The method of claim 4, further comprising the step of:
inserting the solid mass of brazing alloy within the first cavity and the second cavity.

10. The method of claim 4, wherein the step of aligning, the solid mass of brazing alloy is partially received by the first cavity and partially received by the second cavity.

11. The method of claim 4, wherein the step of brazing, the solid mass of brazing alloy melts outwardly from within the first cavity and the second cavity into a gap between the tool body and the cutting tip.

12. The method of claim 4, wherein the cutting tip and the tool body are aligned into final position with the solid mass of brazing alloy.

13. A method comprising the steps of:
positioning a solid mass of brazing alloy between a first cavity of a tool body and a second cavity of a cutting tip, wherein the first cavity and the second cavity are substantially equal in dimensions;
mounting the cutting tip upon the tool body in final position with the solid mass of brazing alloy; and
brazing, with the mass of brazing alloy, the cutting tip to the tool body to form a rotatable cutting bit.

14. The method of claim 13, further comprising the step of:
aligning the second cavity with the first cavity by a portion of the solid mass of brazing alloy that protrudes from the tool body.

15. The method of claim 13, further comprising the steps of:
contacting a base portion of the cutting tip with a head portion of the tool body, wherein the cutting tip has a plurality of pegs that extend outwardly from the base portion; and
wherein the step of brazing, the solid mass of brazing alloy disposed in the first cavity and the second cavity melts outwardly into a gap defined by the plurality of pegs between the base portion and the head portion.

16. The method of claim 1, wherein the solid mass of brazing alloy is spherical in shape.

17. The method of claim 1, wherein the portion of the solid mass of brazing alloy that protrudes engages the second cavity to prevent lateral movement of the cutting tip relative to the tool body during assembly.

18. The method of claim 4, wherein the solid mass of brazing alloy is spherical in shape.

19. The method of claim 4, wherein the first cavity and the second cavity are substantially equal in dimensions.

20. The method of claim 13, wherein the first cavity and the second cavity are hemispherical in shape.

\* \* \* \* \*